United States Patent [19]

Grey et al.

[11] Patent Number: 5,310,808
[45] Date of Patent: May 10, 1994

[54] FLAME-RETARDANT THERMOPLASTIC COPOLYMERS BASED ON VINYL PHOSPHONATE DERIVATIVES GRAFTED ONTO RUBBER

[75] Inventors: Roger A. Grey; Shao H. Guo, both of West Chester, Pa.

[73] Assignee: Arco Chemical Technology, L.P., Wilmington, Del.

[21] Appl. No.: 922,600

[22] Filed: Jul. 30, 1992

[51] Int. Cl.⁵ .................... C08F 255/06; C08F 279/02
[52] U.S. Cl. .................................. 525/287; 525/285; 525/301; 525/308; 525/316; 525/289
[58] Field of Search ............... 525/285, 287, 301, 308, 525/316, 289

[56] References Cited

U.S. PATENT DOCUMENTS

| | | | |
|---|---|---|---|
| 2,439,214 | 4/1948 | Lindsey | 260/84 |
| 2,743,261 | 4/1956 | Coover et al. | 260/85.5 |
| 3,725,359 | 4/1973 | Goswami et al. | 260/78.5 |
| 3,725,509 | 4/1973 | Kraft et al. | 260/899 |
| 3,726,839 | 4/1973 | Jin | 260/78.5 |
| 3,977,954 | 8/1976 | Needles et al. | 525/287 |
| 3,992,481 | 4/1976 | Kraft et al. | 260/873 |
| 3,993,635 | 11/1976 | Mango, III | 260/42.18 |
| 3,993,715 | 11/1976 | Hwa et al. | 260/884 |
| 4,014,836 | 3/1977 | Kraft et al. | 260/29.6 |
| 4,035,571 | 7/1977 | Brunner et al. | 526/275 |
| 4,390,597 | 6/1983 | Chauvel | 525/287 |
| 4,444,969 | 4/1984 | Young | 526/262 |
| 4,571,418 | 2/1986 | Young | 525/148 |

OTHER PUBLICATIONS

*Rubber-Toughened Plastics, Advances in Chemistry Series* 2, C. Keith Riew, Editor, (1989), Chapters 1 and 2, pp. 1–64.

*Primary Examiner*—Vasu S. Jagannathan
*Attorney, Agent, or Firm*—Jonathan L. Schuchardt

[57] ABSTRACT

Flame-retardant, thermoplastic copolymers and processes for making them are disclosed. The compositions are copolymers of a vinyl aromatic monomer, a vinyl phosphonic acid derivative, and optionally, an unsaturated organic diacid, ester, or anhydride that are grafted onto a rubber. Processes for making polymers having high molecular weight, good mechanical properties, and a high level of evenly distributed, chemically incorporated vinyl phosphonate flame retardant are also disclosed.

7 Claims, No Drawings

FLAME-RETARDANT THERMOPLASTIC COPOLYMERS BASED ON VINYL PHOSPHONATE DERIVATIVES GRAFTED ONTO RUBBER

FIELD OF THE INVENTION

The invention relates to thermoplastic compositions and processes for making them. In particular, the compositions are flame-retardant thermoplastic copolymers of vinyl phosphonic acid derivatives that are grafted onto a rubber.

BACKGROUND OF THE INVENTION

Thermoplastic polymers, such as polystyrene, styrene-maleic anhydride copolymers, and impact-modified versions of these, have many uses. Often, the usefulness of these materials is limited by their inherent combustibility. One conventional approach to improving flame retardancy of thermoplastics is to add high levels of halogen and/or phosphorus-containing salts, compounds, or polymers. These flame-retardant additives can adversely impact certain physical properties of the thermoplastic polymers, such as heat resistance, impact strength, and tensile strength. Also, the additives can lose their effectiveness by leaching out of the polymer. Halogenated flame retardants are particularly troublesome because they can produce toxic and corrosive gases in a fire.

A second approach to making flame-retardant thermoplastics is to chemically incorporate the halogen or phosphorus into the polymer chains. This can be accomplished after polymer synthesis, for example, by reacting the polymer with a phosphorus reagent (see, e.g., U.S. Pat. No. 3,993,635). Preferably, chemical incorporation is effected by preparing the polymer in the presence of a copolymerizable phosphorus- or halogen-containing monomer. Although chemical incorporation is usually preferred over the additive approach, it has several drawbacks. Special, expensive monomers may be needed; many of these monomers lack the favorable reactivity ratios required for copolymerization to give polymer products that have a high enough level of phosphorus or halogen to be sufficiently flame retardant.

Kraft et al. (U.S. Pat. Nos. 3,725,509 and 4,014,836) teach copolymers useful as flame-retardant additives for thermoplastic polymers. The copolymers are made from a halogen-containing unsaturated monomer (vinyl halide, halogenated styrene, etc.) and a bis(hydrocarbyl) vinyl phosphonate. Optionally, the copolymer includes one or more other copolymerizable monomers such as α-olefins, acrylates, dicarboxylic acids or anhydrides, vinyl aromatic monomers, and the like. The copolymer additives can be used as flame retardants for a wide variety of thermoplastics.

Younes (U.S. Pat. Nos. 4,444,969 and 4,571,418) teaches copolymers of vinyl aromatic monomers, bis(hydrocarbyl) vinyl phosphonates, and imide derivatives of unsaturated anhydrides (maleimide, N-phenylmaleimide, etc.).

Brunner et al. (U.S. Pat. No. 4,035,571) teach flame-retardant copolymers of a bis(hydrocarbyl) vinyl phosphonate, an unsaturated monomer, and acrylic or methacrylic acid.

Unfortunately, the poor mechanical properties of vinyl phosphonate polymers, especially those that incorporate a large amount of phosphorus, limits their usefulness per se as flame-retardant polymers.

Flame-retardant thermoplastic polymers are needed. Preferably, the polymers have both high phosphorus content and good mechanical properties. Also desirable are flame-retardant compositions that incorporate the flame retardant into the polymer chains so that additives are not needed.

SUMMARY OF THE INVENTION

Objects of the invention: (1) flame-retardant thermoplastic compositions that contain chemically incorporated flame retardants; (2) thermoplastic compositions based on vinyl phosphonic acid derivatives that have good mechanical properties; (3) flame-retardant, impact-modified polystyrenic compositions; (4) improved processes for making flame-retardant polymers based on vinyl phosphonic acid derivatives.

The invention is a flame-retardant polymer composition that is grafted onto a rubber. The composition comprises recurring units of: (a) a vinyl aromatic monomer; (b) a vinyl phosphonic acid derivative selected from vinyl phosphonic acids and vinyl phosphonate mono- and diesters; and (c) optionally, one or more additional ethylenically unsaturated monomers. The rubber is preferably polybutadiene, polyisoprene, EPDM, styrene-butadiene rubber, or the like.

The invention also includes a flame-retardant polymer composition grafted onto a rubber which comprises recurring units of: (a) a vinyl aromatic monomer; (b) an unsaturated organic diacid, mono- or diester, or anhydride; (c) a vinyl phosphonic acid derivative selected from vinyl phosphonic acids and vinyl phosphonate mono- and diesters; and (d) optionally, one or more additional ethylenically unsaturated monomers.

Processes for making flame-retardant polymer compositions grafted onto a rubber are also included in the invention. In one process, a vinyl phosphonic acid derivative is continuously added to a polymerization mixture that contains a vinyl aromatic monomer, a free-radical initiator, and a rubber.

In another process of the invention, the flame-retardant composition is prepared by polymerizing, in an aqueous suspension and in the presence of a phase-transfer catalyst, a vinyl aromatic monomer, a rubber, and a vinyl phosphonic acid derivative that has relatively good water solubility.

DETAILED DESCRIPTION OF THE INVENTION

The polymer compositions of the invention comprise recurring units of a vinyl aromatic monomer and a vinyl phosphonic acid derivative that are grafted onto a rubber backbone.

Vinyl aromatic monomers useful in the invention are aromatic hydrocarbons that contain a vinyl or α-substituted vinyl group. Suitable vinyl aromatic monomers include, but are not limited to, styrene, alkyl-substituted styrenes, vinyl naphthalenes, α-methylstyrene, alkyl-substituted α-methylstyrenes, tert-butylstyrenes, halogenated styrenes, alkoxystyrenes, hydroxystyrenes, acetoxystyrenes, α-carboxystyrenes (acids and esters), α-alkoxystyrenes (vinyl ethers), and the like, and mixtures thereof. Styrene and halogenated styrenes (such as 4-chlorostyrene, tribromostyrene, etc.) are preferred vinyl aromatic monomers.

Vinyl phosphonic acid derivatives useful in the invention are vinyl phosphonic acids and vinyl phosphonate mono- and diesters. Preferred vinyl phosphonic acid derivatives have the formula:

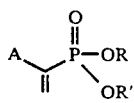

in which each of A, R, and R' separately represents a monovalent radical selected from the group consisting of hydrogen and $C_1$–$C_{30}$ alkyl, aryl, aralkyl, and halogen-substituted alkyl and aryl. Preferably, A is an aryl or halogen-substituted aryl group.

Suitable vinyl phosphonic acid derivatives also include cyclic vinyl phosphonate diesters of the formula:

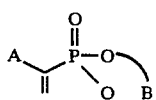

in which A is as described above, and B is a linear or branched divalent hydrocarbyl radical. Preferred cyclic vinyl phosphonate diesters are those in which B is —$CH_2$—$CH_2$— or —$CH(CH_3)$—$CH_2$—.

Suitable vinyl phosphonic acid derivatives include, but are not limited to, vinyl phosphonic acid, 1-methylvinyl phosphonic acid, 1-phenylvinyl phosphonic acid, dimethyl 1-phenylvinyl-phosphonate, 1-phenylvinyl phosphonic acid monomethyl ester, cyclic ethylene glycol and propylene glycol esters of 1-phenylvinyl phosphonic acid, bis(chloroethyl)-1-phenylvinyl phosphonic acid, 1-(4-bromophenyl)vinyl phosphonic acid, 1-(4-bromophenyl)vinyl phosphonic acid dimethyl ester, and the like, and mixtures thereof. Particularly preferred are 1-phenylvinyl phosphonic acid and its mono- and dialkyl esters.

The vinyl aromatic monomer and vinyl phosphonic acid derivative can be used in any desired proportion. A preferred composition comprises from about 50 to about 99 mole percent of the vinyl aromatic monomer and from about 1 to about 50 mole percent of the vinyl phosphonic acid derivative. A more preferred range is from about 85 to about 98 mole percent of the vinyl aromatic monomer and from about 2 to about 15 mole percent of the vinyl phosphonic acid derivative.

The polymer compositions of the invention are grafted onto a rubber. Suitable rubbers include, but are not limited to, polybutadiene, polyisoprene, nitrile rubber, EPDM rubber, styrene-isoprene copolymers, styrene-butadiene copolymers, ABS rubber, and the like, and mixtures thereof. The rubber can be a homopolymer or a random, block, or graft copolymer.

Any desired amount of rubber can be used. It is preferred to use an amount of rubber within the range of about 1 to about 50 weight percent based on the total amount of polymer composition. A more preferred range is from about 2 to about 20 weight percent. Most preferred is the range from about 4 to about 18 weight percent.

The invention also includes polymer compositions that include recurring units of an unsaturated organic diacid, ester (mono- or diester), or anhydride. Preferred esters are $C_1$–$C_{20}$ mono- and dialkyl esters of the unsaturated diacid. Suitable organic diacids and anhydrides include, but are not limited to, maleic acid, fumaric acid, itaconic acid, citraconic acid, maleic anhydride, citraconic anhydride, and the like, and mixtures thereof.

Preferred compositions of the invention comprise from about 30 to about 98 mole percent of a vinyl aromatic monomer, from about 1 to about 50 mole percent of a vinyl phosphonic acid derivative, and from about 1 to about 30 mole percent of an unsaturated organic diacid, mono- or diester, or anhydride. More preferred ranges are from about 60 to about 90 mole percent of the vinyl aromatic monomer, and from about 2 to about 20 mole percent each of the vinyl phosphonic acid derivative and the unsaturated diacid, ester, or anhydride. Preferred compositions include styrene and maleic anhydride. Most preferred are compositions that include styrene, maleic anhydride, and a 1-phenylvinyl phosphonic acid derivative. The compositions of the invention optionally include recurring units of one or more additional ethylenically unsaturated monomers. Suitable ethylenically unsaturated monomers include, but are not limited to, conjugated dienes (isoprene, 1,3-butadiene), vinyl halides, vinylidene halides, α-olefins (ethylene, propylene), vinyl esters of carboxylic acids (vinyl acetate), aryl and alkyl esters of acrylic and methacrylic acid (methyl methacrylate, benzyl acrylate), acrylic and methacrylic acids, amides of ethylenically unsaturated carboxylic acids (acrylamide, methacrylamide), nitriles of ethylenically unsaturated carboxylic acids (acrylonitrile, methacrylonitrile), alkyl vinyl ethers (methyl vinyl ether), and the like, and mixtures thereof.

The compositions of the invention will have number average molecular weights within the range of about 30,000 to about 400,000. A preferred range is from about 40,000 to about 250,000. Most preferred is the range from about 80,000 to about 150,000.

The compositions of the invention optionally include a plasticizer. Any plasticizer known for thermoplastic polymers can be used. Suitable examples include, but are not limited to, mineral oil, silicone oil, polyalkylene glycols, polyalkylene glycol ethers, amine-terminated polyethers, and the like, and mixtures thereof.

Any desired amount of plasticizer can be used. Preferred is an amount within the range of about 0.5 to about 5 weight percent based on the total weight of the polymer. A more preferred range is from about 2 to about 4 weight percent.

The compositions of the invention can generally be processed thermally over a wide temperature range. A preferred range is from about 100° C. to about 350° C. More preferred is the range from about 200° C. to about 250° C.

The compositions of the invention are advantageously used by themselves as flame-retardant thermoplastics. The compositions can also be blended with other thermoplastics to modify physical properties. The compositions can also be used as flame-retardant additives. It is expected that the compositions will also find utility in water-treatment applications as dispersants, flocculents, or complexing agents.

The invention includes processes for making flame-retardant polymer compositions grafted onto a rubber. We have found that when a conventional bulk or solution polymerization process is used to copolymerize a vinyl aromatic monomer and a vinyl phosphonic acid derivative—i.e., when the monomers are simply combined and copolymerized—polymer molecular weight drops sharply as the initially charged level of vinyl phosphonic acid derivative increases. Consequently, polymer products having both high molecular weight (and correspondingly good mechanical properties) and a high level of vinyl phosphonate incorporation cannot be produced in a conventional combine-and-copolymerize process.

We have developed processes that, for the first time, make it possible to prepare copolymers having high molecular weights, good mechanical properties, and a high level of evenly distributed vinyl phosphonate monomer units.

In one process, a vinyl phosphonic acid derivative is continuously added to a polymerization mixture that contains a vinyl aromatic monomer, a free-radical initiator, and a rubber. Continuous addition of the vinyl phosphonic acid derivative is the key to preparing copolymers that have a high enough level of vinyl phosphonate for good flame retardancy (for example, about 10 weight percent of vinyl phosphonic acid derivative), and at the same time, a high enough molecular weight for good mechanical properties. The process also permits the preparation of copolymers in which the flame-retardant monomer is more evenly distributed compared with vinyl phosphonate copolymers prepared by a conventional process. Thus, by adding the vinyl phosphonic acid derivative continuously to the other components as the reaction proceeds, polymers having high molecular weight, good mechanical properties, and a high level of evenly distributed, chemically incorporated vinyl phosphonate flame retardant can be prepared.

The vinyl phosphonic acid derivative can be added continuously or intermittently provided that the addition is gradual. The continuous addition process is well suited for bulk, solution, emulsion, or suspension polymerizations. An inert organic solvent is normally used for solution polymerizations. The free-radical initiator can be present initially in the reaction mixture, or it can be added continuously, intermittently, or in one portion, as desired.

In another process of the invention, a flame-retardant polymer composition is prepared by aqueous suspension polymerization. In this process, a vinyl aromatic monomer, a rubber, and a relatively water-soluble vinyl phosphonic acid derivative are combined and polymerized in an aqueous suspension in the presence of a phase-transfer catalyst. In contrast to the process of the invention described above, this process gives polymers having high molecular weights and satisfactory phosphorus incorporation without the need for mechanical continuous addition of the vinyl phosphonate derivative. The phase-transfer catalyst appears to continuously transport the vinyl phosphonate monomer from the aqueous phase to the organic phase in which copolymerization occurs, so a mechanical continuous addition is not needed. This process is limited to vinyl phosphonic acid derivatives that have relatively good solubility in water, and relatively poor solubility in the liquid monomer (organic) phase. If the vinyl phosphonic acid derivative is too soluble in the organic phase, then high molecular weight copolymers will not be obtainable. (This problem is analogous to the problems of conventional bulk or solution polymerizations with vinyl phosphonic acid derivatives described earlier.) Suitable relatively water-soluble vinyl phosphonic acid derivatives include most vinyl phosphonic acids and monoesters.

Any known phase-transfer catalyst can be used. Preferred phase-transfer catalysts are quaternary organoammonium and phosphonium compounds. Particularly preferred are tetraalkylammonium halides and hydroxides that contain $C_4$–$C_6$ groups, such as tetra-n-butylammonium bromide and tetra-n-pentylammonium hydroxide. Any suitable amount of phase-transfer catalyst can be used. Typically, the amount used is within the range of about 1 to about 10 mole percent based on the number of moles vinyl phosphonic acid derivative. A more preferred range is from about 4 to about 8 mole percent. The polymerization processes of the invention can be performed at any desired temperature. A preferred temperature range is from about 50° C. to about 300° C. More preferred is the range from about 70° C. to about 150° C.; most preferred is the range from about 90° C. to about 135° C.

A free-radical initiator is used in the processes of the invention. Suitable initiators are those known in the art, including, for example, peroxides, azo compounds, and the like, and mixtures thereof. Specific examples are benzoyl peroxide, di-tert-butyl perbenzoate, azobis-(isobutyronitrile), and the like.

An inert organic solvent can be used if desired in the processes of the invention as a reaction solvent or diluent. Suitable solvents include, but are not limited to, aliphatic and aromatic hydrocarbons, cycloaliphatic hydrocarbons, halogenated aromatic and aliphatic hydrocarbons, ethers, esters, ketones, and the like, and mixtures thereof. An organic solvent is advantageously used to add a normally-solid monomer continuously to the reaction mixture. For example, 1-phenylvinyl phosphonic acid, a solid at room temperature, can be conveniently dissolved in tetrahydrofuran and added continuously to a polymerization mixture containing styrene.

Following polymerization, the polymer product is isolated by any convenient means. One method of isolating the polymer is to precipitate it from an organic solution. The polymer is dissolved in any convenient organic solvent or mixture of solvents (for example, tetrahydrofuran and toluene), and a precipitating agent (such as a lower aliphatic alcohol) is added. The precipitated polymer is then stripped of solvent and is thermally processed into any desired form. Polymerization can alternatively be followed directly by extrusion or any other suitable finishing process.

The following examples merely illustrate the invention. Those skilled in the art will recognize numerous variations that are within the spirit of the invention and scope of the claims.

Example 1 Styrene/1-Phenylvinyl Phosphonic Acid Copolymer Grafted onto Butadiene-Styrene Copolymer Continuous Addition Process A two-liter reaction kettle equipped with addition pump, stirrer, temperature controller, heating mantle, condenser, and nitrogen inlet is charged with "Stereon S-721" copolymer (butadiene-styrene (90/10) copolymer, 200 g, product of Firestone Synthetic Rubber & Latex Co.) and styrene (800 g). 1-Phenylvinyl phosphonic acid (50 g), chlorobenzene (300 g), and benzoyl peroxide (0.44 g) are added to the rubber solution. A mixture of 1-phenylvinyl phosphonic acid (283 g), benzoyl peroxide (2.0 g), and tetrahydrofuran (126 g) is charged to the addition pump. After purging the reaction kettle with nitrogen, the reaction mixture is heated with stirring to 115° C. over 30 min. The solution in the addition pump is then continuously added to the reaction kettle at a rate of 22 g/h while maintaining a reaction temperature of about 115° C. After the monomer addition is complete, the polymerization continues for an additional 2 h at 115° C. The reaction mixture is cooled to 60° C., and a mixture of toluene (300 g), tetrahydrofuran (300 g), and 2,6-di-tert-butyl-4-methylphenol (BHT) (1.0 g) is added to dilute the polymer solution. The terpolymer is precipitated from isopropyl alcohol and is dried in a vacuum oven at 70° C. Yield: 499 g.

The product has: $M_w = 9.6 \times 10^5$; $M_n = 4.2 \times 10^4$ (determined by gel-permeation chromatography using polystyrene standards); $T_g = 135°$ C. (by differential scanning calorimetry with 10° C./min heating rate); 3.2 wt.% phosphorus (by elemental analysis). The polymer is molded by compression at 250° C. into tensile bars and UL94 standard flex bars. The specimens have tensile strength-2500 psi and 3.3% elongation at break, and pass the burn test with a UL94V-0 rating.

COMPARATIVE EXAMPLE 2
Styrene/1-Phenylvinyl Phosphonic Acid Copolymer Grafted onto Polybutadiene Continuous Addition Process Not Used A 12-oz. glass reaction bottle is charged with styrene (50 g), 1-phenylvinyl phosphonic acid (15 g), "Diene 35", rubber (polybutadiene, 7.5 g, product of Firestone Synthetic Rubber Latex Co.), and benzoyl peroxide (0.2 g). The bottle is purged with nitrogen, capped, and tumbled end-over-end in a bottle polymerizer at 115° C. for 6 h, then at 135° C. for another 6 h. The resulting polymer is dissolved in tetrahydrofuran and precipitated from methanol. The product, which has $M_w = 1.4 \times 10^4$, is waxy and too brittle to be molded into flex or tensile bars for physical property testing.

EXAMPLE 3 Styrene/1-Phenylvinyl Phosphonic Acid Copolymer Grafted onto Polybutadiene Suspension Polymerization Under Phase-Transfer Conditions Glass reaction bottles are charged with a mixture prepared by combining styrene (62 g), "Diene 35" polybutadiene (14 g), 1-phenylvinyl phosphonic acid (20 g), benzoyl peroxide (0.12 g), tert-butyl perbenzoate (0.12 g), tetra-n-butylammonium bromide (15 g), partially hydrolyzed polyacrylamide (0.5 g), distilled water (100 g), and "Jeffamine M-715" monoamine-functionalized polyether (3.2 g, product of Texaco Chemical Co.) as a plasticizer. The bottles are purged with nitrogen, capped, and tumbled end-over-end in a bottle polymerizer at 115° C. for 6 h, then at 135° C. for another 6 h. The resulting polymer beads are isolated, washed with aqueous isopropyl alcohol, and dried in a vacuum oven at 60° C.

The injection-molded product has the following properties: $M_w = 1.98 \times 10^5$; $M_w/M_n = 3.6$; tensile strength at break=2280 psi; elongation at break=12.7%; tensile yield strength=2840 psi; tensile modulus=198,000 psi; flexural modulus (73° F.)=216; notched Izod impact=0.6 ft-lb/in; DTUL (264 psi)=193° F.; falling weight strength=5.1 ft-lb; UL94 burn test rating=UL94V-0.

COMPARATIVE EXAMPLE 4
Styrene/1-Phenylvinyl Phosphonic Acid Copolymer—Not Grafted onto a Rubber The procedure of Example 3 is followed, but the "Diene 35" polybutadiene is omitted. The resulting polymer product is too brittle to give satisfactory molded specimens for physical property testing.

EXAMPLE 5 Styrene/Dimethyl 1-Phenylvinylphosphonate/maleic Anhydride Terpolymer Grafted onto Butadiene/Styrene Rubber Continuous Addition Process A one-liter reaction kettle equipped as in Example 1 is charged with a styrene solution of "Stereon S-721" butadiene-styrene copolymer (324 g of 7.4 wt. % polymer solution), dimethyl 1-phenylvinylphosphonate (15 g), and benzoyl peroxide (0.10 g). A solution of maleic anhydride (25 g), benzoyl peroxide (0.70 g), and dimethyl 1-phenylvinylphosphonate (85 g) is charged to the addition pump. After purging the reaction kettle with nitrogen, the reaction mixture is heated with stirring to 115° C. over 30 min. The solution in the addition pump is then continuously added to the reaction kettle at a rate of 22 g/h while maintaining a reaction temperature of about 115° C. After the monomer addition is complete, the polymerization continues for an additional 2 h at 115° C. The reaction mixture is cooled to 60° C., and a mixture of toluene (100 g), tetrahydrofuran (100 g), and BHT (0.2 g) is added to dilute the polymer solution. The terpolymer is precipitated from isopropyl alcohol and is dried in a vacuum oven at 70° C. Yield: 211 g.

The terpolymer product has: $M_w = 1.17 \times 10^5$; $M_n = 4.5 \times 10^4$; $T_g = 115°$ C.; maleic anhydride unit content=5.5 wt. % (measured by titration); 2.8 wt. % phosphorus. The polymer is molded by compression at 200° C. into tensile bars and standard UL94 flex bars. The specimens have tensile strength=1128 psi, elongation at break=4.3%, and pass the burn test with a UL94V-0 rating.

COMPARATIVE EXAMPLE 6 Styrene/Dimethyl 1-Phenylvinyl-phosphonate/maleic Anhydride Terpolymer—Not Grafted onto a Rubber The procedure of Example 5 is followed, but the "Stereon S-721" butadiene-styrene copolymer is omitted. The resulting polymer product is too brittle to give satisfactory molded specimens for physical property testing.

EXAMPLE 7 Styrene/1-Phenylvinyl Phosphonic Acid/maleic Anhydride Terpolymer Grafted onto Butadiene-Styrene Rubber Continuous Addition Process The procedure of Example 5 is followed except that the initial mixture contains 1-phenylvinyl phosphonic acid (15 g) instead of the phosphonate diester. A solution of maleic anhydride (25 g), benzoyl peroxide (0.70 g), 1-phenylvinyl phosphonic acid (85 g), and tetrahydrofuran (50 g) is added continuously from the addition pump. The terpolymer is precipitated from isopropyl alcohol and dried in the usual way.

The terpolymer has: $M_w = 1.27 \times 10^5$; $M_n = 5.0 \times 10^4$; $T_g = 130°$ C.; 2.8 wt. % phosphorus. The polymer is molded by compression at 250° C. into tensile bars and standard UL94 flex bars. The specimens have tensile strength=1157 psi, elongation at break=1.6%, and pass the burn test with a UL94V-0 rating.

The preceding examples are meant only as illustrations. The true metes and bounds of the invention are defined by the following claims.

We claim:
1. A flame-retardant polymer composition comprising recurring units of:
(a) a vinyl aromatic monomer;

(b) a vinyl phosphonic acid derivative selected from the group consisting of vinyl phosphonic acids and vinyl phosphonate mono- and diesters; and (c) optionally, one or more additional ethylenically unsaturated monomers;

wherein the composition is grated onto from about 1 to about 50 wt. % based on the total amount of polymer composition of a rubber selected from the group consisting of polybutadiene, polyisoprene, EPDM rubber, styrene-isoprene copolymers, and styrene-butadiene copolymers; and wherein the polymer composition has a number average molecular weight within the range of about 30,000 to about 400,000.

2. The composition of claim 1 wherein the vinyl aromatic monomer is selected from the group consisting of styrene, alkyl-substituted styrenes, vinyl naphthalenes, α-methylstyrene, alkyl-substituted α-methylstyrenes, tert-butylstyrenes, halogenated styrenes, alkoxystyrenes, acetoxystyrenes, hydroxystyrenes, α-carboxystyrenes, and α-alkoxystyrenes.

3. The composition of claim 1 which comprises:

(a) from about 50 to about 99 mole percent of vinyl aromatic monomer recurring units; and (b) from about 1 to about 50 mole percent of vinyl phosphonic acid derivative recurring units.

4. The composition of claim 1 wherein the vinyl phosphonic acid derivative has the formula:

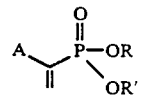

in which each of A, R, and R' separately represents a monovalent radical selected from the group consisting of hydrogen and $C_1$–$C_{30}$ alkyl, aryl, aralkyl, and halogen-substituted alkyl and aryl.

5. The composition of claim 1 wherein the vinyl phosphonic acid derivative has the formula:

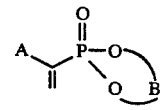

in which A is a monovalent radical selected from the group consisting of hydrogen and $C_1$–$C_{30}$ alkyl, aryl, aralkyl, and halogen-substituted alkyl and aryl, and B is a divalent linear or branched hydrocarbyl radical.

6. The composition of claim 1 wherein the vinyl aromatic monomer is styrene and the vinyl phosphonic acid derivative is derived from 1-phenylvinyl phosphonic acid.

7. The composition of claim 1 wherein the composition includes recurring units of an unsaturated organic diacid, ester, or anhydride.

* * * * *